(12) United States Patent
Kerkeslager et al.

(10) Patent No.: US 9,211,962 B2
(45) Date of Patent: Dec. 15, 2015

(54) METHODS AND SYSTEMS FOR ORIENTING ARTICLES

(71) Applicant: MULTISORB TECHNOLOGIES, INC., Buffalo, NY (US)

(72) Inventors: Jason Kerkeslager, Amherst, NY (US); Mark Brug, Lackawanna, NY (US); Brian D. Kamas, Cheektowaga, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 138 days.

(21) Appl. No.: 13/661,674

(22) Filed: Oct. 26, 2012

(65) Prior Publication Data

US 2014/0116843 A1 May 1, 2014

(51) Int. Cl.
B65G 47/14 (2006.01)
B65B 1/14 (2006.01)

(52) U.S. Cl.
CPC ............. B65B 1/14 (2013.01); B65G 47/1464 (2013.01); *B65B 2220/14* (2013.01)

(58) Field of Classification Search
CPC .............. B65G 47/24; B65G 47/1407; B65G 47/1428; B65G 47/1435; B65G 47/1457; B65G 47/1464
USPC ........................................................ 198/392
See application file for complete search history.

(56) References Cited

U.S. PATENT DOCUMENTS

| | | | | | |
|---|---|---|---|---|---|
| 3,386,562 | A | * | 6/1968 | Miller | 198/392 |
| 3,599,829 | A | * | 8/1971 | Aidlin et al. | 221/100 |
| 4,094,121 | A | | 6/1978 | Ganholt | |
| 4,429,808 | A | * | 2/1984 | Doty | 221/167 |
| 4,610,345 | A | * | 9/1986 | Spreen et al. | 198/392 |
| 4,705,156 | A | * | 11/1987 | Boling | 198/392 |
| 4,995,503 | A | * | 2/1991 | Graham et al. | 198/392 |
| 5,031,748 | A | * | 7/1991 | Bianchini et al. | 198/380 |
| 5,145,051 | A | * | 9/1992 | Hoppmann | 198/396 |
| 5,248,025 | A | * | 9/1993 | Neu | 198/454 |
| 5,297,666 | A | * | 3/1994 | Marti Sala | 198/380 |
| 5,320,147 | A | | 6/1994 | Jamrog | |
| 5,415,322 | A | * | 5/1995 | Sala | 221/169 |
| 5,443,149 | A | * | 8/1995 | Rohwetter et al. | 198/392 |
| 5,791,127 | A | | 8/1998 | Rossi | |
| 6,216,845 | B1 | * | 4/2001 | Polese | 198/398 |
| 6,578,699 | B2 | * | 6/2003 | Baird et al. | 198/392 |
| 7,975,852 | B2 | * | 7/2011 | Charpentier et al. | 209/523 |
| 8,430,228 | B2 | * | 4/2013 | Herzog | 198/392 |
| 2003/0024599 | A1 | | 2/2003 | Hagano et al. | |
| 2008/0283358 | A1 | * | 11/2008 | Milot | 198/392 |

FOREIGN PATENT DOCUMENTS

JP 2011084290 4/2011

* cited by examiner

*Primary Examiner* — Mark A Deuble
(74) *Attorney, Agent, or Firm* — Lee & Hayes, PLLC

(57) ABSTRACT

An apparatus for orienting articles includes a bowl having a sidewall and angled relative to horizontal, a disc disposed in the bowl and rotatable relative to the bowl, the disc having a radius proximate its outer periphery defining a groove sized to receive one of the articles in a predetermined orientation, and a diverter for diverting canisters contained in the groove through an outlet in the sidewall of the bowl.

27 Claims, 4 Drawing Sheets

METHODS AND SYSTEMS FOR ORIENTING ARTICLES

BACKGROUND OF THE INVENTION

1. Technical Field

This invention relates to material handling and packaging. More specifically, the invention relates to a system and method for accurately and quickly orienting articles, such as desiccant canisters, for repeatable conveyance.

2. Description of Related Art

Sorbents have been used conventionally in packaging of products to extend the life of those products. In one application, a sorbent is provided in a canister, such as a polymer-based canister, and that canister is placed in a larger container designed to hold some product. This application is particularly well known in the pharmaceutical and nutraceutical arts, in which the sorbent canister is placed in a bottle or vial along with dry pharmaceuticals, such as pills, to absorb any moisture in the bottle.

Conventionally, the canisters have been placed in the containers before or after they are filled with the pharmaceutical and either manually or by automated processes. However, the demand for pharmaceuticals has increased immensely. While automated processes to dispense pharmaceuticals have been re-worked to quicken the dispensing of the pharmaceutical into the container, the time it takes to place the canister in the container is too slow. In fact, the act of placing the sorbent canister in the container is one of the slowest processes, and thus slows the entire pharmaceutical packaging system.

One of the reasons that insertion of sorbent canisters into larger containers is slow is that it is difficult to orient canisters upstream of a dispensing station, so that a steady supply of canisters is available.

Thus, there is a need in the art for an improved system that quickly and reliably orients sorbent canisters, for example, to prepare them for dispensing.

SUMMARY OF THE INVENTION

The present disclosure addresses the foregoing needs in the art by providing systems and methods for orienting a plurality of like articles, such as sorbent canisters.

In one aspect, an apparatus for orienting articles includes a bowl having a sidewall and angled relative to horizontal, a disc disposed in the bowl and rotatable relative to the bowl, the disc having a radius proximate its outer periphery defining a groove sized to receive one of the articles in a predetermined orientation, and a diverter for diverting canisters contained in the groove through an outlet in the sidewall of the bowl.

These and other aspects, features, and benefits of the invention will be appreciated further with reference to the following detailed description of the invention and accompanying figures, in which preferred embodiments are described and illustrated.

BRIEF DESCRIPTION OF THE DRAWING FIGURES

DETAILED DESCRIPTION OF THE INVENTION

This disclosure relates generally to dispensing articles in a controlled and consistent manner. An exemplary embodiment will be described hereinafter in which the article is a substantially-cylindrical canister containing a sorbent. The invention is not limited to dispensing sorbent canisters. Those having ordinary skill in the art will understand that the inventive concepts of this disclosure may be applied across a number of industries, to dispense any number of differently sized and constituted articles.

Figure 1:
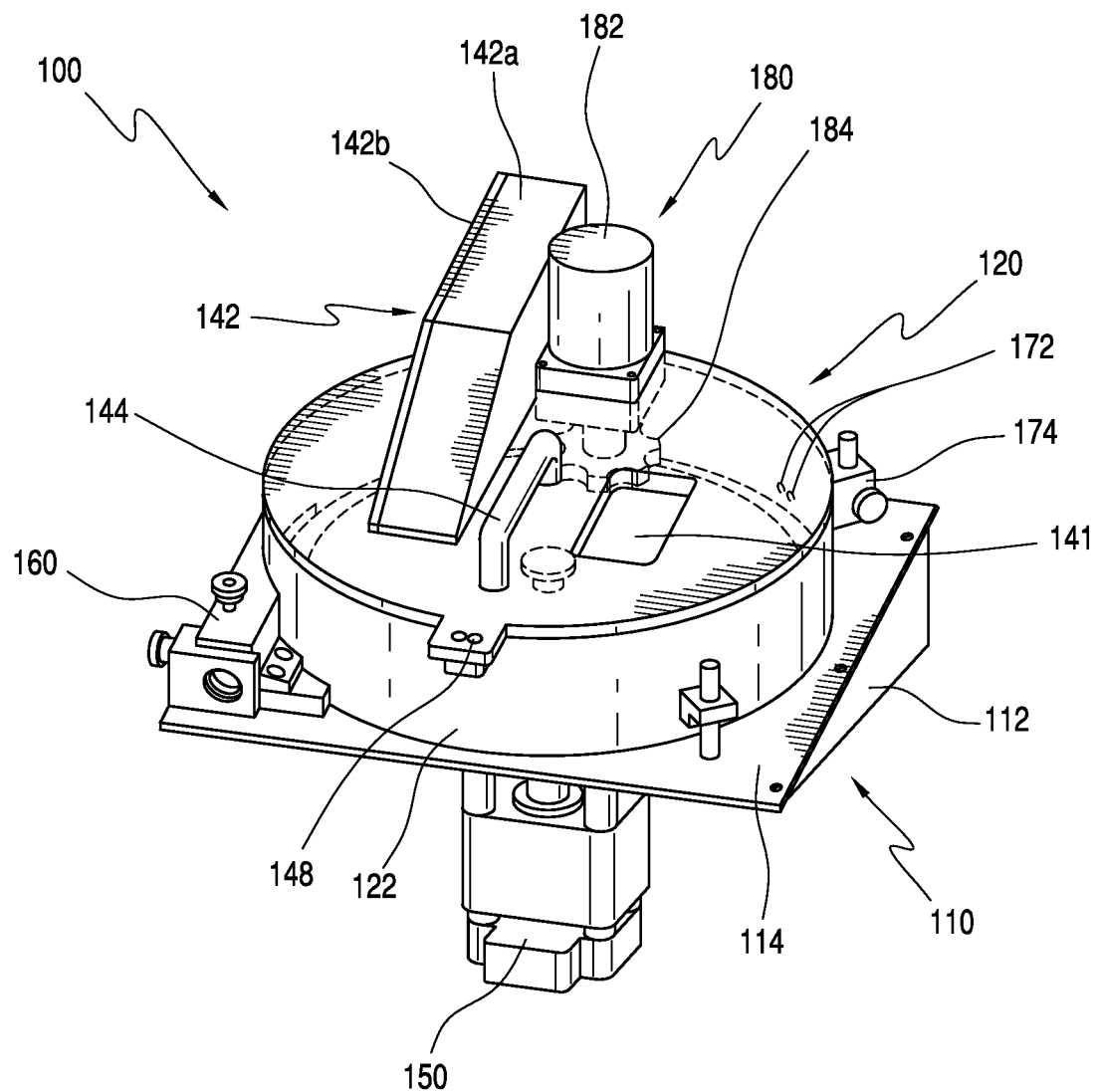
FIG. 1 is a perspective view of a feeder bowl assembly according to one embodiment of the invention.

One embodiment of the invention is illustrated in FIG. 1, which is a feeder bowl assembly 100. In one application, the feeder bowl assembly 100 comprises an article supply that acts like a hopper to receive a relatively large quantity of sorbent canisters and orient the canisters for transport via a conduit, such as to an inserting or dispensing station. Thus, the feeder bowl assembly 100 is preferably provided with an outlet 160 connectable to a conduit or other device that carries the canisters away from the feeder bowl assembly. Although the feeder bowl assembly 100 will be described herein as being related to sorbent canister dispensing, it is not limited to that use. The feeder bowl assembly 100 may be used with any number of articles in which it is desirable to orient and provide like articles at an outlet of the feeder bowl assembly 100.

As shown in FIG. 1, the feeder bowl assembly 100 generally includes a feeder bowl 120 disposed on a base 110, a sorting disc 130, a lid 140, and an actuator 150. Those components will be discussed below in more detail.

The base 110 includes a pair of angled sides 112 and a top surface 114. The angled sides 112 are disposed on a horizontal surface, and the top surface is fixed to the sides 112, to angle the substantially planar top surface 114, relative to the horizontal. In a preferred embodiment, the top surface 114 is angled relative to horizontal between about 10-degrees and about 15-degrees and more preferably about 14-degrees. The purpose of the angled top surface 114 will be described in more detail below.

The bowl 120 generally includes a cylindrical sidewall 122 that extends upwardly from the base 110, terminating at a bowl top 124. More specifically, the sidewall 122 is disposed on and extends upwardly normal to the top surface of the base. Accordingly, the bowl 120 is angled relative to horizontal. The sidewall 122 is preferably made of a material such as sheet metal, and is formed into the cylindrical shape.

The base 110 of the feeder bowl assembly is sufficiently rigid to support the sidewall 122 of the bowl 120. In one embodiment, the base 110 includes an annular ring 116 fixed to its top surface 114 and extending thereabove. The sidewall 122 is fixed to an outer surface of the ring 116, e.g., using conventional fasteners. In another embodiment, a groove may be formed in the top surface of the base approximating the shape of the lower edge of the sidewall. When assembled, the sidewall is contained in the groove and fasteners are used to fix the sidewall relative to the base.

The base 110 also includes a central cutout 118, which will be described in more detail, below.

Figure 3A:
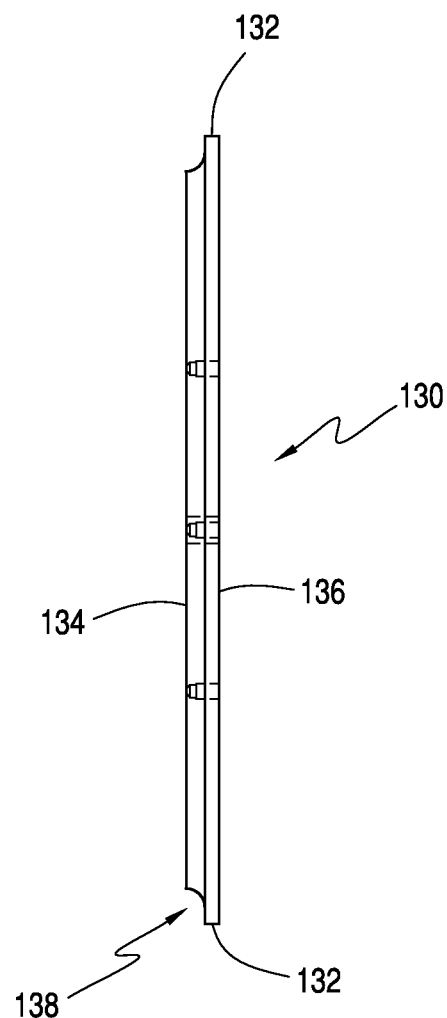
FIGS. 3A and 3B are, respectively, side and sectional views of a sorting disc used in the feeder bowl assembly illustrated in FIG. 1.
Figure 3B:
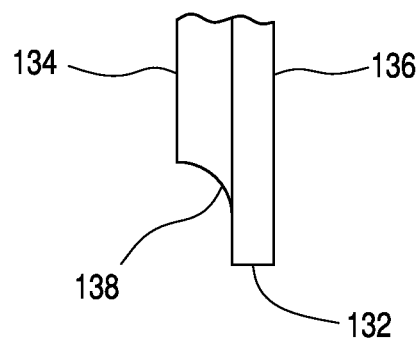

The sorting disc 130 is illustrated in FIGS. 3A and 3B. As shown, it is cylindrical with an outer edge 132, a planar top surface 134 and a planar bottom surface 136. The disc 130 is sized to be received coaxially inside the cylindrical bowl 120, proximate the bottom of the bowl 120. Accordingly, the disc 130 is angled with respect to horizontal. The disc 130 has a radius that is only slightly smaller than that of the bowl sidewall 122. Accordingly, when articles are placed in the bowl, they are retained because they sit on the disc 130 and contact the sidewall at the peripheral edges of the disc 130. Along the outer edge 132, on the top surface 134, the disc 130 includes a radius 138 formed about its circumference. The radius 138 is sized to generally correspond to an outer surface of a canister to be used in the assembly 100. That is, the radius 138 defines an arc that is approximately the same size as an arc formed by the outer circumference of a sorbent canister. The radius 138 cooperates with the sidewall 122 of the bowl 120 to form a groove that will receive a single canister, on its side, i.e., the canister's longitudinal axis is aligned parallel to the top surface 134 of the disc 130. That is, the sizing of the radius, together with the spacing of the outer edge 132 of the disc 130 relative to the sidewall 122 of the bowl 120 provides a space along the outer periphery of the disc for a single canister to fit, on its side.

In the embodiment of the figures, the radius 138 forms the groove, but a radius is not required. Other stepped profiles or any profile having an overall concave shape may alternatively be used, so long as they provide a groove in which the canisters can be properly oriented.

The actuator 150 is disposed on a bottom of the top surface 114 and is connected to the sorting disc 130 to rotate the disc 130. In the illustrated embodiment, a mounting flange 152 is provided on the body of the actuator 150, to connect the actuator to the sorting disc through the base central cutout 118. In the illustrated embodiment, the disc 130 includes a through hole 132 through which the shaft of a knob 139 passes. In one embodiment, the shaft of the knob threadably engages with a rotating shaft on the actuator 150. Other methods of attaching the disc 130 to the actuator 150 also will be appreciated by those having ordinary skill in the art.

In operation, a plurality of like-shaped and like-sized canisters are placed into the bowl, on top of the disc. Because the bowl is angled relative to horizontal, gravity will act on the canisters to pull them to the low side of the bowl. The disc rotates, preferably continuously, and as it rotates, canisters filter into the groove created by the radius 138 on the disc 130 and the sidewall 122. Proper sizing of the radius and friction between the disc 130 and the canisters retains properly oriented canisters in the groove as the disc rotates. Thus, canisters oriented in the groove are successfully rotated from the low side of the bowl, around the circumference of the bowl. In the illustrated embodiment, the disc rotates counterclockwise to deliver canisters approximately 270-degrees from the lowest position to an outlet 160.

Figure 4A:
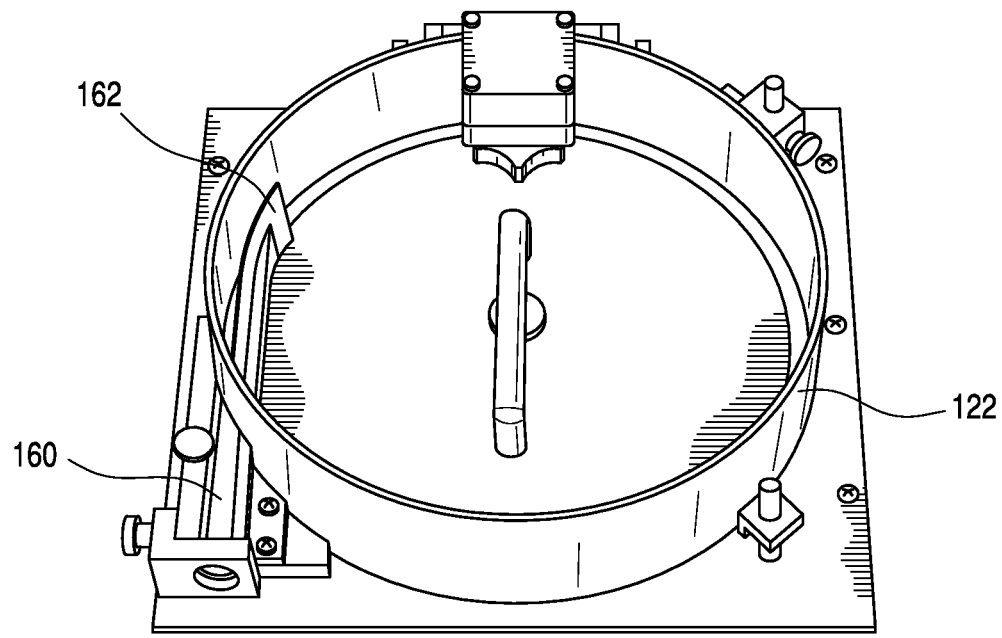
FIGS. 4A and 4B are, respectively, perspective views of a bowl and a diverter used in the feeder bowl assembly illustrated in FIG. 1.
Figure 4B:
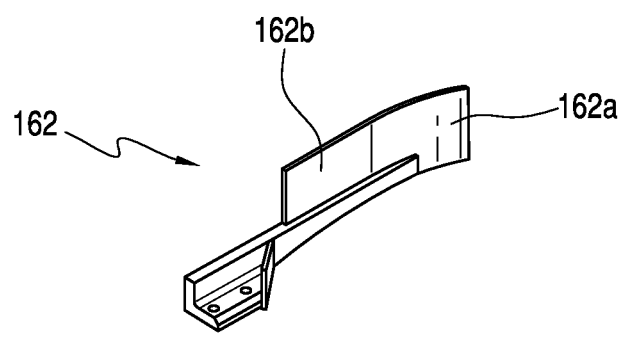

The outlet 160 is illustrated in FIGS. 4A and 4B and generally includes a diverter wall 162, having a generally arcuate lead section 162a and a planar section 162b. The diverter wall 162 is positioned inside the bowl 120, above the disc 130, such that as canisters approach the diverter, they enter a space defined by the sidewall and the lead section 162a. Continued rotation of the disc, and therefore the canister, causes the canister to contact the planar section 162b, which stops the canister from continuing around the bowl. The diverter wall 162 is disposed in an opening (not shown) of the sidewall 122, through which the canisters are directed by the diverter wall 162. The canisters are diverted through an opening 166 that may be configured to mate with a conduit, for example, which will deliver the canisters downstream.

As will be appreciated from the foregoing, canisters randomly placed into the bowl 120 will orient properly in the circumferential groove formed by the radius 138 and the sidewall 122. As the disc 130 rotates under the canisters, oriented canisters rotate around the bowl until they are diverted out of the bowl at the outlet 160.

While the canisters will generally orient properly, the feeder bowl assembly also includes provisions to ensure that improperly oriented canisters do not interfere with proper operation. Once such provision includes a series of cutouts 172 (two are shown) in the sidewall and a compressed air source 174 provided outside the bowl 120 blowing air through the cutouts 172. The cutouts are at a height of the sidewall that is slightly above a properly oriented canister contained in the groove. Thus, compressed air entering the bowl through the cutouts 172 will not affect the properly oriented canister, but will push any canister that is not properly oriented, e.g., because it is standing on end or is on top of a properly oriented canister, toward the center of the bowl. Once in the center of the bowl, the canister will fall back to the bottom and await its next opportunity to enter the groove.

Figure 2:
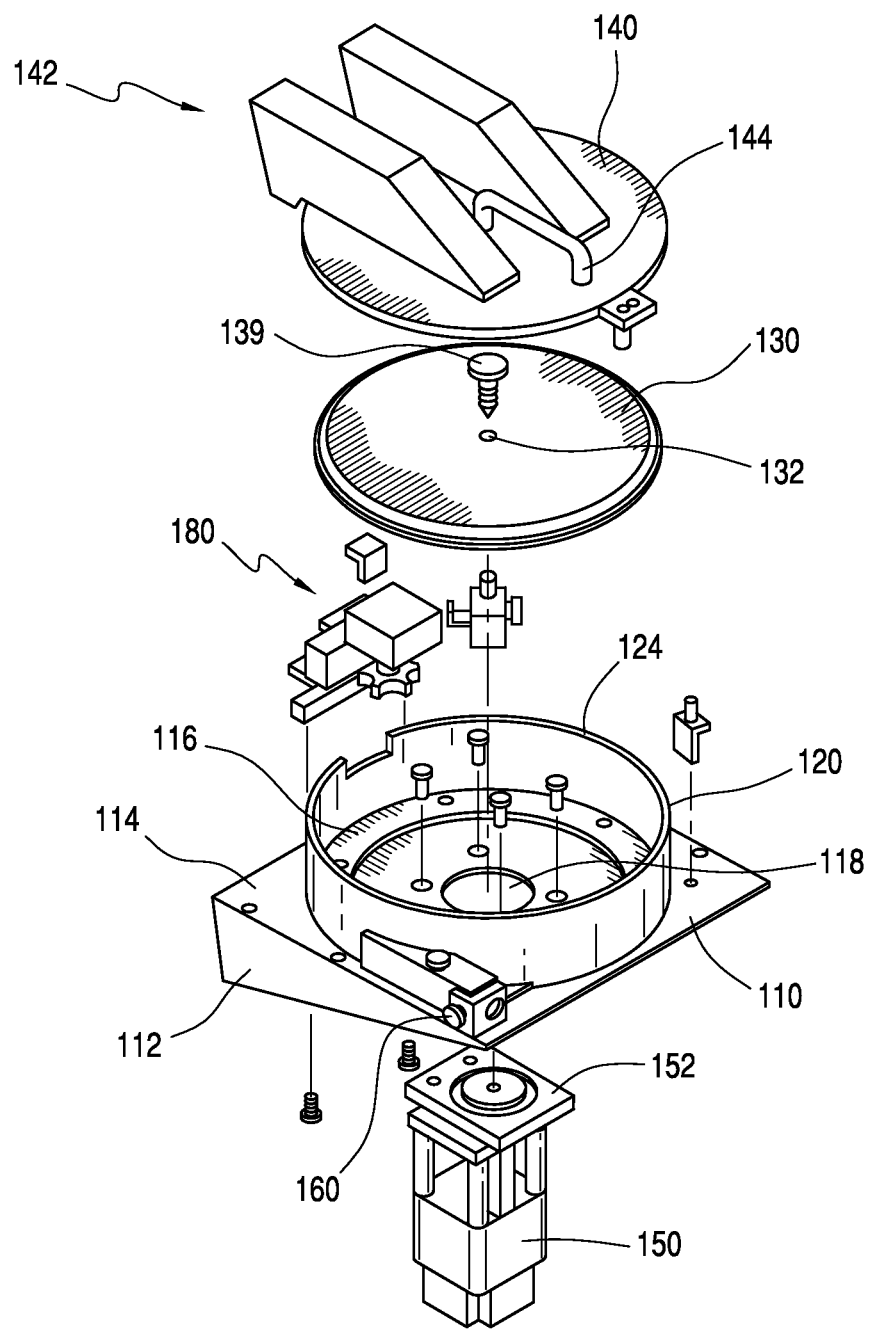
FIG. 2 is an exploded perspective view of the feeder bowl assembly illustrated in FIG. 1.

FIGS. 1 and 2 also illustrate a rotating mechanism 180 that rejects improperly oriented canisters. More specifically, the rotating mechanism 180 includes a rotary actuator 182 and a star-wheel 184 disposed on the shaft of the actuator 182. The star-wheel is positioned in the rotational path of the disc 130, above the height of properly oriented canisters. Thus, canisters that are not properly oriented, e.g., because they are standing on end or are on top of properly oriented canisters, will be contacted by the rotating star-wheel 184 and knocked toward the center of the bowl 120.

Although the illustrated embodiment shows both the compressed-air and star-wheel provisions for removing improperly oriented canisters, only one of these solutions may be necessary. Other solutions also may be utilized. For example, a physical stop, such as a wall protruding inwardly from the sidewall above the height of a properly-oriented canister may be sufficient to remove any improperly oriented canisters.

Filling the bowl with canisters may be accomplished through the bowl's open top, but, as shown in FIGS. 1 and 2, preferably is accomplished through inlets 142 mounted on the lid 140. The inlets are preferably fixed over openings formed in the lid 140 and have a vertical opening 141 through which canisters are inserted into the bowl. An angled top extends from the top of the vertical opening to the radially inner-most portion of the opening in the lid 140, although this shape is not necessary. Moreover, although the inlets 142 are shown as being two-pieced, with a main body 142a and attachable cover 142b, they could be a single piece. The illustrated construction is merely for ease of manufacture. Flaps (not shown) or the like may be provided over the vertical openings 141.

The lid 140 is retained on the bowl 110 to cover the open top of the bowl. Any known mechanism(s) may be used to retain and remove the lid 140. In the illustrated embodiment, the lid 140 also includes a handle 144. A conventional keyed safety switch 148 also is provided, to ensure that the lid 140 is not unsafely removed, e.g., while the bowl is in operation. The lid may be made from any conventional materials, and in some embodiments is preferably clear such that a user can visually inspect an amount of canisters therein.

The inventors have found that an angle of between about 10 and 15 degrees relative to horizontal is sufficient to both allow gravity to carry canisters to the low end of the bowl and allow the canisters to stay in the groove as the disc rotates. It is possible, however, that in some instances friction may not be sufficient to retain the canisters in the groove as the disc rotates. For example, if the canisters are specially coated, they may have a tendency to fall back toward the low end of the bowl when the disc rotates, instead of continuing along over the high end of the bowl and out the outlet 160. Accordingly, in another embodiment a compressed air nozzle may be provided along the path of the canister, to provide an assisting force to ensure that properly-oriented canisters do not slide back down the groove toward the low end of the bowl. Put another way, the system may be further provided with one or more in-line air jets, to push the canisters counterclockwise in the groove, toward the outlet.

In another embodiment, also to combat the issue of canisters slipping back in the groove, the disc is provided with a relatively higher friction surface at the radius. For example, the surface of the radius may be knurled or otherwise textured. Or, an entirely different material, which provides higher friction, may be applied to the radius. For example, a material could be applied by adhesive or the like, and that has a higher coefficient of friction than the disc material.

The feeder bowl assembly described above is particularly useful at orienting generally cylindrical articles, although it could be used to orient other articles, as required. Moreover, the feeder bowl assembly is adaptable to differently-sized articles. For example, the size of the radius in the disc may be altered to create a larger or smaller groove. Moreover, the heights of the star wheel 184, air outlets 172 and any applicable sensors may also be raised or lowered to accommodate differently sized canisters.

While the invention has been described in connection with several presently preferred embodiments thereof, those skilled in the art will appreciate that many modifications and changes may be made therein without departing from the true spirit and scope of the invention which accordingly is intended to be defined solely by the appended claims.

The invention claimed is:

1. An apparatus comprising:
  a base comprising a top surface;
  a sidewall extending upwardly from the top surface of the base to form a bowl;
  at least one cylindrical sorbent canister disposed in the bowl, the cylindrical sorbent canister comprising a sidewall disposed between opposing ends;
  a disc disposed in the bowl at an angle relative to horizontal and rotatable relative to the bowl, the disc including a stepped profile along its outer periphery, wherein the stepped profile together with the sidewall defines a groove sized to receive the cylindrical sorbent canister in an orientation in which the cylindrical sorbent canister is arranged on its sidewall with a longitudinal axis of the cylindrical sorbent canister arranged substantially parallel to a tangent to the sidewall of the bowl adjacent the article;
  an actuator mounted to an underside of the base and extending through a hole in the base to connect with and drive the disc; and
  a diverter wall diverting the cylindrical sorbent canister in the predetermined orientation contained in the groove through an outlet in the sidewall of the bowl.

2. The apparatus of claim 1, wherein the top surface of the base is disposed at an angle relative to horizontal.

3. The apparatus of claim 1, further comprising a compressed air source arranged to provide a stream of compressed air.

4. The apparatus of claim 3, wherein the compressed air source is arranged to divert cylindrical sorbent canisters proximate the groove that are not in the predetermined orientation.

5. The apparatus of claim 3, wherein the compressed air source is arranged to provide compressed air substantially tangential to the disc, to act on the cylindrical sorbent canister in the predetermined orientation in the groove.

6. The apparatus of claim 1, wherein the diverter wall comprises a distal, arcuate portion and an intermediate straight portion.

7. The apparatus of claim 1, further comprising a mechanism for diverting cylindrical sorbent canisters that are not oriented in the predetermined orientation away from the periphery of the disc.

8. The apparatus of claim 7, further comprising a lid disposed on the bowl.

9. The apparatus of claim 1, wherein the groove has a higher friction surface than a top surface of the disc.

10. The apparatus of claim 1, further comprising a star wheel to divert cylindrical sorbent canisters proximate to the groove that are not oriented properly.

11. The apparatus of claim 1, wherein the disc is disposed at an angle between 10° and 15°.

12. The apparatus of claim 1, wherein the disc has a diameter that is only slightly smaller than a diameter of the bowl, and the step profile includes a radial profile that approximates an outer circumference of the sidewall of the articles.

13. A method of orienting cylindrical sorbent canisters, each of the canisters having a cylindrical sidewall with an outer circumference extending between opposite ends, the method comprising:
  providing a bowl with a sidewall and a disc disposed to rotate in the bowl, the disc disposed at an angle relative to horizontal and including a radius approximating the outer circumference of the cylindrical sorbent canisters at a top surface of an outer periphery, wherein the radius and the sidewall define a groove sized to receive the cylindrical sorbent canisters in a predetermined orientation;
  supplying a randomly oriented plurality of the cylindrical sorbent canisters into the bowl;
  continuously rotating the disc in the bowl to orient the cylindrical sorbent canisters in the groove with a portion of the cylindrical sidewall contacting the radius; and
  diverting properly oriented cylindrical sorbent canisters to an outlet with a diverter having a distal arcuate section and an intermediate straight section proximate a portion of the outer periphery of the disc.

14. The method of claim 13, wherein the continuous rotating of the disc conveys the oriented cylindrical sorbent canisters in the groove toward the diverter.

15. The method of claim 13, further comprising diverting cylindrical sorbent articles from the periphery of the disc that are not oriented properly.

16. The method of claim 15, further comprising providing a compressed air stream to divert the cylindrical sorbent canisters that are not oriented properly.

17. The method of claim 15, further comprising providing a mechanical protrusion to divert the cylindrical sorbent canisters that are not oriented properly.

18. The method of claim 15, further comprising providing a rotating member to divert the cylindrical sorbent canisters that are not oriented properly.

19. The method of claim 18, wherein the rotating member comprises a star wheel.

20. An apparatus for orienting cylindrical articles having a cylindrical sidewall and opposing, generally parallel ends, comprising:
  a base comprising a top surface that is tilted;
  a circular sidewall extending upwardly from the top surface of the base to form a bowl; and
  a disc disposed in the bowl, the disc arranged substantially parallel to the tilted top surface of the base and rotatable relative to the bowl, the disc including a stepped profile along its outer periphery that together with the circular sidewall define a groove sized to receive the cylindrical articles in a predetermined orientation in which the generally parallel ends of the articles are substantially perpendicular to the top surface, wherein the disc has a diameter that is only slightly smaller than a diameter of the bowl, and the stepped profile includes a radial profile that approximates an outer circumference of the cylindrical sidewall of the articles.

21. The apparatus of claim 20, further comprising a source of compressed air to divert articles proximate to the groove that are not in the predetermined orientation.

22. The apparatus of claim 20, further comprising a source of compressed air arranged substantially tangential to the disc to act on the articles in the predetermined orientation in the groove.

23. The apparatus of claim 20, wherein the top surface of the base is tilted between 10° and 15°.

24. The apparatus of claim 20, further comprising a star wheel to divert articles proximate to the groove that are not in the predetermined orientation.

25. The apparatus of claim 20, further comprising a diverter wall diverting the articles in the predetermined orientation in the groove to an outlet, wherein the diverter wall comprises a distal, arcuate portion and an intermediate straight portion.

26. The apparatus of claim 20, further comprising an actuator disposed to rotate the disc.

27. The apparatus of claim 20, further comprising a diverter diverting properly oriented articles to an outlet.

* * * * *